Sept. 20, 1938.   A. DERVIEUX   2,130,537
ARRANGEMENT FOR COPYING LENTICULAR FILMS
Filed Feb. 6, 1936   2 Sheets-Sheet 1

Inventor:
André Dervieux;
By his attorneys,
Baldwin & Wight

Sept. 20, 1938.                A. DERVIEUX                2,130,537
            ARRANGEMENT FOR COPYING LENTICULAR FILMS
                       Filed Feb. 6, 1936           2 Sheets-Sheet 2
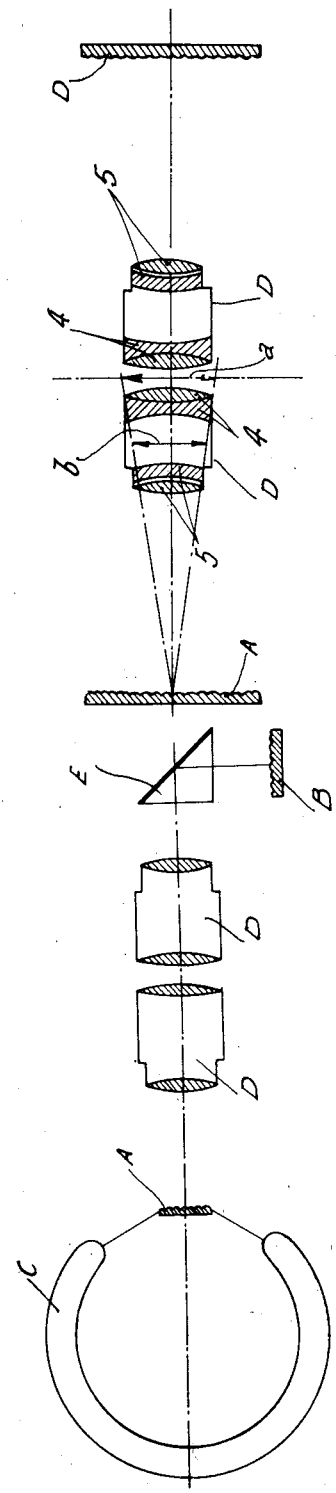
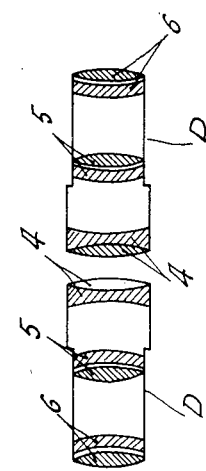

Patented Sept. 20, 1938

2,130,537

UNITED STATES PATENT OFFICE 2,130,537

ARRANGEMENT FOR COPYING LENTICULAR FILMS

André Dervieux, Paris, France, assignor, by mesne assignments, to Henry Lymne Walker, Paris, France Application February 6, 1936, Serial No. 62,677
In Great Britain February 14, 1935

3 Claims. (Cl. 88—24)

Lenticular films, viz. those comprising a coating on a support made up of an assembly of microscopic lenticular elements can be used in known ways to obtain any of the following effects:—

(a) Kinematographic or still images exhibiting natural colours when projected (colour film).

(b) Photographic prints appearing in relief on direct observation (relief photographs).

(c) Kinematographic images exhibiting relief when projected upon a suitable screen (relief film).

(d) Kinematographic images appearing when projected upon a suitable screen in colours and in relief.

Whichever of these effects it is desired to obtain by means of lenticular films it is important in actual practice to have some means for reproducing the film and making as many copies as may be desired, at the same time exhibiting the same effect as the original. Moreover the method of operation must be simple, rapid and economical.

Now, it is well known that kinematographic or photographic images on lenticulated film cannot be satisfactorily copied by direct contact printing. If such an attempt were made there would be in fact between each pair of adjacent lenticular elements of the film to be reproduced (original film) a zone of reduced illumination, and the effect of these zones through the lenticular elements of the film to be printed (copy) would be to produce an image of which the form and density would depend on the relative position of the lenticular pattern on the original film to that on the copy film.

In view of the microscopic dimensions of the lenticular elements (from ½₂ to ½₈ mm.) it is practically impossible to make them exactly coincide and the variations in density produced on the copy come into evidence as lines of shadow called "moirés" or "waterings". The waterings make the copies entirely useless.

The same defect occurs when making copies by projection without taking special precautions, the reasons being just the same.

Various methods have already been proposed to prevent the formation of waterings on the copies and these are based on one or other of two different principles.

(a) By a mechanical process, the watering has been in effect spread over the whole image on the copy film. In this way a shadow of greater or less opacity is obtained, which perceptibly changes the nature of the colours in a colour film.

(b) Using optical principles, endeavours have been made by means of suitable optical systems to give precisely defined directions to the light rays passing through the refractive network of the original film and that of the copy film. Success has certainly been achieved in this way in the elimination of waterings but this has been at the expense of extremely fine adjustments and expensive and delicate apparatus.

Furthermore, and whatever process be preferred, if the corrections of the optical system employed for printing do not comply with certain well defined geometrical conditions, it very frequently happens that the image of the copy exhibits either colour fringes in the case of colour film or zones of distorted relief in the case of relief film.

The method according to the present invention has the object of overcoming all these disadvantages and consequently of providing for the reproduction of images on lenticular film under conditions of absolute identity with reference to the original image and without recourse to delicate and complicated arrangements.

The reproduction carried out by this method may be employed for copying the same size as the original, for reduction such as on to 16 mm. or 17.5 mm. film or for enlargement, but the colour or relief of the original film is always faithfully reproduced.

According to the invention the illumination of the film to be reproduced is effected by means of a source of light distributed over a wider angle than the angular aperture of the lenticular elements and providing stronger illumination at oblique angles than at normal incidence so as to secure as nearly as possible uniform illumination of the exit pupil of each lenticular element in spite of the increased loss of light at oblique incidences. The obliquity of the rays of light is, of course, to be considered in planes perpendicular to the lines of lenticulation of the film.

It has previously been proposed for the purpose of reproducing lenticular film to use a source of light fitting the angular aperture and to use a diaphragm of special shape to produce a non-uniform distribution of light over the sensitive surface of each element. It is, however, precisely this non-uniformity or other non-uniformity not deliberately produced, which gives rise to waterings, since it is impossible to keep the lenticulation of the two films in exact coincidence.

The angular extent of the source of illumination in relation to the film should accordingly be the greatest possible even approaching 180°. Further, it will be advisable to ensure as nearly as possible the equivalent of a continuous source of illumination and consequently a regular increase of strength of the rays with increasing obliquely of incidence on the film. The illumination should also be distributed symmetrically with reference to a plane passing through the axis of the optical system perpendicular to the film and parallel to the lenticulation.

By suitably grading the strength of the source of light at its various parts in relation to the angle of incidence on the film, it is easily possible completely to do away with dark zones on the original film corresponding to the furrow of each line of lenticulation and alternate dark and bright stripes on the copy film which are registered on the sensitive layer in the form of waterings. These defects appear when the original film is illuminated by a homogeneous or uniformly directed beam of light, whether it be convergent, parallel or divergent.

Now in the majority of known methods and arrangements for reproducing lenticulated films an endeavour has been made in principle to illuminate the lenticular network of the original film by means of uniformly directed rays of light impinging on the film at the same angle of incidence, namely, one as near as possible to that of the rays of light received in taking the picture. It should not be surprising in these conditions that the application of this principle does not give consistent results as regards the elimination of waterings.

A reproducing arrangement for lenticular films in accordance with the invention will thus comprise in essence one or more sources of light arranged in a straight or curved line in a plane perpendicular to the lines of lenticulation of the film, and so distributed that the strength of the light impinging on the film increases rapidly in terms of the obliquity of incidence. The desired variation may be effected or assisted by light modifying or directing means, such as one or more screens of variable or constant opacity, or one or more fixed or moving reflecting arrangements. An oscillating source of light may also be employed. The actinic power may furthermore be constant or variable as between one and another element of a multiple light source.

It will however be recognized that the above arrangement can advantageously be supplemented by certain further devices to permit good reproduction of lenticular films. If the lighting arrangement of the invention is used for the printing of copies by contact, the waterings will certainly disappear but at the expense of sharpness in the copy because of the angular spread of the light and the interposition between the two sensitive surfaces of the film supports. The invention will therefore be generally confined in practice to copying by projection.

It is known in fact that the original image registered through the lenticular network is characterized by the image given by each element of the "exit pupil" of the picture recording lens system, the "exit pupil" being defined as the image of the objective diaphragm as seen through the rear lens combination of this objecitve. In the case of colour reproduction, the colour filter is arranged in the plane of the diaphragm.

The result is that on proceeding to the projection of an image in colours on a lenticular film (either on a screen or for making a copy) this exit pupil is reproduced in a particular plane.

The uniformity of illumination according to the invention is to be considered as applied to the area of the exit pupil, so that mere uniform illumination of the image is not sufficient, but it is advantageous, furthermore, to retain on the copy film a scale of planes agreeing as closely as possible with that of the original film, and also to take into account the fact that in the case of colour film this original film may or may not have been taken by means of a collimated objective. Collimation however depends precisely on the virtual position of the pupil, which is moved to infinity with a collimated objective.

To obtain first of all the identical effect of colour or relief on the image of a copy film it is necessary to retain on the latter the scale of the planes recorded on the original film. If in practice the planes recorded on the lenticular film of the copy exhibit for example double the spacing of these recorded on the original film, the relative sharpness of the distant planes and the front planes will be reduced by half; thus in projection of colour films on a screen, colour fringes will be formed round objects and their images will not be clear, and in the case of stereoscopic or relief film the perspective will be distorted.

To ensure the maintenance on the copy of a scale of planes identical with that of the original, it will be advantageous to use an optical reproduction system comprising two objectives of the "Petzval" type or portrait objectives as nearly aplanatic as possible in relation to the scale on which the original image is to be reproduced, whether the same size, reduced, or enlarged.

If the original film has been taken with a collimated objective care will be taken in addition to select the rear lens combination of the first objective (next to the original film) so that, due to the convergence of its elements, the pupil recorded on the original film will be moved to a plane almost touching the front lens combination of this objective; the second objective, identical with the first, will make it possible for the copy film to register at the same time as the image a pupil likewise projected to infinity and consequently identical with that of the original film.

If the original film has been taken with a noncollimated objective, the virtual position of the pupil then being at a definite distance from the original film and in fact within the first objective of the optical reproduction system, the type of reproducing objective used will be such that the optical assembly made up of the front combination of the first objective and the front and rear combinations of the second objective will have a focal plane coinciding with the image plane of the pupil. This will make it possible to project the virtual position of the pupil to infinity in relation to the plane of the copy film.

The accompanying drawings show diagrammatically some of the possible ways in which the invention can be put into practice, and therein Figures 1 to 4 show various arrangements for the illumination of the original film.

Figure 5 shows a copying arrangement added to the arrangement shown in Figure 3.

Figure 6 illustrates a reproducing objective shown between the original film (collimated or not collimated) and the copy film.

Figure 7 shows a different type of reproducing objective.

Figure 1:
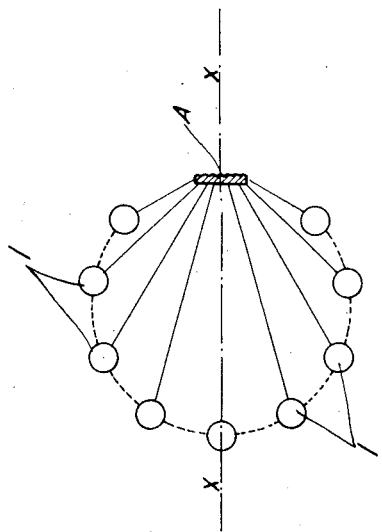
Figure 2:
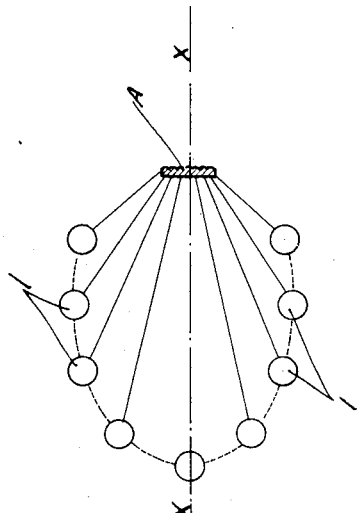

Referring to Figure 1 the luminous source is made up of a series of lamps 1 arranged in a circle behind the original film A. Figure 2 shows the luminous source 1 arranged on an arc of approximately elliptic form. In both cases the actual source of light in each of the lamps I should be small and the individual lamps should be as near as possible together. The luminous or actinic power of these lamps may be increased or decreased by means of appropriate electrical, mechanical or optical arrangements.

Figure 3:
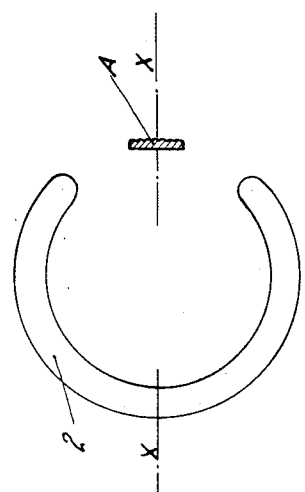

In the arrangement of Figure 3 the series of lamps I is replaced by a luminous discharge tube in the shape of an arc, but other shapes are also possible. This tube could be replaced by an incandescent lamp having a continuous luminous filament of the desired shape.

Figure 4:
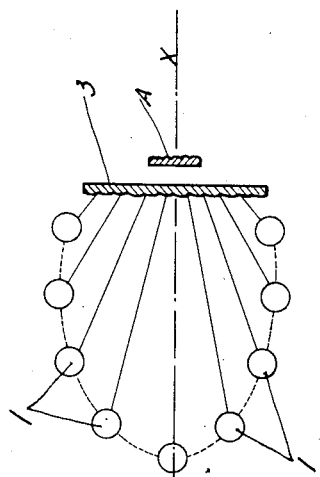

The effect of a continuous luminous filament can be obtained by using as shown in Figure 4 a series of lamps I like those of Figure 1 or 2 and interposing between the lamps I and the original film A an optical diffraction arrangement 3 such as a diffraction grating to spread each luminous point into the form of a line long enough to form a continuation of the line produced by the next lamp.

Figure 5 shows diagrammatically a complete arrangement for copying lenticular film by projection. As before A is the original film, B the copy film, each passing through an ordinary gate, the driving mechanisms of these gates being reversed with reference to each other. C is the lighting arrangement which is shown in Figure 3 but could be of any of the other kinds referred to. D, D are the copying objectives which must of course comply with the conditions of aperture and focus generally employed in photography and kinematography in relief or in colours on lenticular film. Finally, E is a right angled prism with silvered hypotenuse face intended to rectify the image reproduced on the copy films. Instead of the prism E it is possible to use a mirror with surface reflection, or any other system for rectifying the image such as a Wollaston prism.

Since the original image is generally positive the image on the copy will correspond with that on the original, that is likewise positive, if development by reversal is used exactly as in the case of the original. It will be necessary to bear in mind when projecting the copies on the screen that the rectification of the image carried out as indicated above has the effect of reversing the position of the pupil on the copy film in relation to the original.

A shutter (not shown) is arranged so as to intercept the light from the lighting system C during the simultaneous movement of the two films A and B.

The objectives D, D are preferably Petzval aplanatic portrait objectives of which the rear lens combinations are of greater or less focal length depending upon whether the original film was taken with a collimated or non-collimated objective.

Figure 6 shows a detailed section of the copying objective and films without the rectifying mirror. 4, 4 are cemented lenses each forming an achromatic and aplanatic front combination for objectives D, D. 5, 5 are uncemented lenses each similarly forming an achromatic and aplanatic back combination. This figure also indicates how to choose the objectives D according to whether the original film is collimated or not.

If it is assumed that the original film A is collimated, the virtual position of the three colour filter, or of the pupil of impression in the case of an image in relief, must be considered as located at infinity and be found within an angle equal to the angular aperture of the objective taking the picture, say for instance F/2.5.

The first objective D (original film side) is so chosen that the plane of the pupil recorded on the original film will on account of the converging power of the rear lens combination of this objective be brought substantially into the plane "a" nearly touching the front lens of this objective. It is obvious that in these conditions, if the second objective is identical with the first the copy film will register at the same time as the image, a pupil projected to infinity and identical with that of the original film.

Taking now the case of an uncollimated film, the pupil is formed within the first objective D, at "b" for example. In order that the projection of the copy film on the screen may not involve any special difficulty, it is advisable to project the virtual position of this pupil to infinity in relation to the plane of the copy film. This can be accomplished by making the optical assembly which is made up of the front combination of the first objective D, the front combination of the second objective and the rear combination of this latter objective have a principal focal plane coinciding with the plane "b" of the pupil of the original film.

When copying film it is possible as indicated in Figure 7 to add to each of the above objectives a back combination of a Petzval objective 6.

If it is desired to copy an original film in a different size it is advantageous to use an asymmetrical system of objectives with the object of vigorously maintaining the conditions of aplanatism according to the conjugate planes occupied by the original film and the copy film. If the original film is to be copied half size for example, it is advantageous to use a system made up of two objectives D of which the foci will be in the ratio of 2 to 1. The longer focus objective will be on the side towards the original film.

It is understood that in all cases the original and copy films are arranged so that the lenticular supports are facing the objectives as shown in Figures 5 and 6.

What I claim is:—

1. An arrangement for copying lenticular film having a source of light for illuminating the original film, said light being distributed over a wider angle than the angular aperture of the lenticular elements of the film to effect substantially uniform illumination of the exit pupil of each lenticular element, said source of light being in an arc exceeding 180° and being disposed approximately in the plane perpendicular to the said lenticular elements so that the strength of the rays over a considerable range is proportional to the obliquity of incidence on the film, a film gate for the original film, and an image-forming optical system for projecting the image on the copy film.

2. An arrangement for copying lenticular film having a source of light for illuminating the original film, said light being distributed over a wider angle than the angular aperture of the lenticular elements of the film to effect substantially uniform illumination of the exit pupil of each lenticular element, said source of light being an approximately arcuate tube and being disposed in the plane perpendicular to the said lenticular elements so that the strength of the rays over a considerable range is proportional to the obliquity of incidence on the film, a film gate for the original film, and an image-forming optical system for projecting the image on the copy film.

3. An arrangement for copying lenticular film having a source of light for illuminating the original film, said light being distributed over a wider angle than the angular aperture of the lenticular elements of the film to effect substantially uniform illumination of the exit pupil of each lenticular element, said source of light comprising a series of illuminating lamps disposed approximately in an arc in the plane perpendicular to the said lenticular elements so that the strength of the rays over a considerable range is proportional to the obliquity of incidence on the film, a film gate for the original film, and an image-forming optical system for projecting the image on the copy film.

ANDRÉ DERVIEUX.